Patented Dec. 20, 1949

2,491,832

UNITED STATES PATENT OFFICE 2,491,832

LIGNIN DISPERSING AGENTS AND METHOD OF MAKING SAME

Jorgen Richter Salvesen and Carlyle Harmon, Wausau, and William C. Browning, Schofield, Wis., assignors to Marathon Corporation, Rothschild, Wis., a corporation of Wisconsin No Drawing. Application September 23, 1946, Serial No. 698,876

9 Claims. (Cl. 260—124)

This invention relates to lignosulfonate products having improved dispersing properties and methods for making same.

The dispersing agents disclosed in this invention are characterized as products which by their presence act to prevent agglomeration or flocculation of solid particles suspended in an aqueous medium.

Waste sulfite liquor is the spent cooking liquor containing in dissolved form the compounds which result when wood chips are cooked at elevated temperature and pressure with bisulfites and sulfurous acid to produce cellulose pulp. Such waste sulfite liquor consists of mainly two groups of organic products, namely, carbohydrate compounds and lignosulfonates. It is known that the latter group of compounds has some dispersing action useful for certain limited applications. However, it is now recognized that the carbohydrate components in waste sulfite liquor not only have no dispersing action but actually counteract the dispersing properties of the lignosulfonates.

We have carried out numerous experiments relating to the surface-active properties of various fractions of the lignosulfonates derived from waste sulfite liquor as well as modifications of such lignosulfonates by means of various chemical processing steps. We have thus discovered novel procedures disclosed herewith which result in relatively low molecular weight lignosulfonate compounds having dispersing properties superior to those previously known in the art and in addition having other desirable properties which render our products particularly useful for certain industrial applications as set forth in detail herewith.

We have found, contrary to previous beliefs, that the higher molecular weight lignosulfonates are not the most effective dispersing agents, and that relatively low molecular weight lignosulfonates which dialyze or can be segregated by other laboratory methods actually have superior dispersing properties. We have found that when lignosulfonates are processed by alkaline hydrolysis at elevated pressure and temperature, with mild oxidation, lower molecular weight lignosulfonates are formed and from the resulting reaction mixture the improved dispersing agents can be obtained by suitable methods of segregation and purification.

As starting material we prefer to use the basic calcium lignosulfonate, obtained from waste sulfite liquor in accordance with United States Patent Reissue No. 18,268 to Howard. To this liquor is added NaOH corresponding to one-half to two-thirds of the weight of the lignin, or sufficient to produce a pH of not less than 10.5 to 11 at the end of the cook which is carried out at temperature between about 140° C. and 170° C. for 90 to 30 minutes. We also maintain a controlled oxidation or combustion by passing air or oxygen through the charge during the cook to the extent of about 25 to 40 gms. $O_2$ per 100 gms. lignin. The reaction between the oxygen and organic matter produces combustion products such as carbon dioxide, oxalic acid, etc. which react to precipitate calcium compounds. The air or oxygen is introduced by any suitable means preferably with stirring or agitation of the solution. The cooked mixture may be treated with water-immiscible alcohols to extract our monomeric phenolic compounds as described in U. S. Patent No. 2,104,701 to Sandborn, but this is not essential for the present invention.

When the cooking conditions and amount of alkali and basic calcium lignosulfonate are so arranged that the cooked liquor has a pH of 10.5 to 11.0, then substantially all the lime is present as insoluble inorganic compounds, mainly $CaCO_3$ which can be removed to give a substantially lime-free solution. To the lime-free solution is added an inorganic acid, i. e. sulfuric, at a temperature of 60 to 80° C. and to give a pH of about 3 to 4 in the mixture which then is carefully heated to 80 to 90° C. whereby the organic precipitate coagulates and can easily be filtered, e. g., in a plate and frame filterpress. It is now very important that the filtercake be thoroughly washed with essentially pure (low-hardness) water until the filtrate shows absence of sulfates since such ions are deterimental to the dispersing action of the product. The organic precipitate thus filtered and washed is partially desulfonated sodium lignosulfonate, substantially free from nonligneous organic compounds and inorganic salts. It has lower average molecular weight than the lignosulfonates used as starting material, as established by viscosity measurements of dilute aqueous solutions. Due to its reduced degree of sulfonation it is difficultly soluble in water and will flock out of such solutions by addition of inorganic electrolytes. This has an important bearing on some uses of the dispersing agent made from this product. The washed filter cake is, however, readily soluble in water when a small amount of NaOH is added to give the mixture a pH of from about 5 to about 9 and from such solution the final product is obtained in form of a dark brown, non-hygroscopic powder by rapid drying as on a drum dryer or in a spray dryer.

While basic calcium lignosulfonate is the preferred starting material for producing the dispersing agent by our above described process, it should be understood that, in general, aqueous solutions of lignosulfonic acid compounds can be used. Thus we can obtain the desired dispersing agent by directly subjecting the untreated waste sulfite liquor to the above described alkaline hydrolysis cook with mild oxidation with air or oxygen, preferably after having concentrated the waste sulfite liquor by evaporation. Such direct treatment of the whole waste sulfite liquor requires more caustic soda and air or oxygen since a part of these reagents is consumed for no useful purpose by the carbohydrate components present in the untreated waste sulfite liquor.

Another starting material for our above described process is the effluent from a process for propagating yeast in waste sulfite liquor whereby the sugars are largely consumed, particularly if the yeast-type Torula utilis is employed. In such process the yeast is segregated and the effluent, then mainly consisting of calcium lignosulfonates, is evaporated to suitable concentration of 150 to 200 g./l. lignin and subjected to alkaline hydrolysis cook with air or oxygen oxidation and further processed as described above.

The dispersing agents obtained as described above have, like all other surface-active agents known, certain specific applications where they are most useful. We have found our products particularly advantageous for preparing aqueous dispersions of carbon black, clay and ZnO. The amount of our dispersing agent required for such applications depends on the particle size of the dispersate, the concentration of the dispersion and the consistency or fluidity desired, but in general from 0.2 to 3.0% dispersing agent, based on the dispersate, will give good results.

The procedures for making dispersions with our dispersing agents are the same as those known in the art. For evaluating dispersing action we prefer to use viscosimetric measurements, such are also most consistent with measuring practical use properties. The relative degree of dispersion of a non-swelling, non-gelatinizing suspension can thus be ascertained by measuring the viscosity of the system, whereby for the same solids concentration and similar conditions, the more fluid the sample the more completely dispersed are the suspended particles. An apparent viscosity value taken immediately after homogenization of the suspension indicates the efficiency of the dispersing agent at a very high rate of shear. This is recorded in data herewith as "initial value." By continuing to measure the apparent viscosity over a period of time, at a constant rate of shear, until the readings become constant, the stability and effectiveness of the dispersing agent at a definite rate of shear is determined. Such determination gives the "equilibrium value." The most effective dispersing agent as measured by these values is one that gives the lowest initial apparent viscosity and that shows little or no increase in apparent viscosity with time. The most suitable commercially available instrument for such measurement is the MacMichael viscosimeter, and for the data given here the apparent viscosity is given as the customary degrees MacMichael (°M.) with a calibrated No. 32 suspension wire.

*Example 1*

The dispersing agent is dissolved in water in concentration previously determined for optimum fluidity. To this solution is added zinc oxide (St. Joseph Lead Company Black Label #20) to give 55% ZnO solids and the mixture is stirred for 15 minutes, homogenized and viscosity determined at 30° C. In table below are given values with our lignin dispersing agent made according to our procedure and for comparison the values of two other representative dispersing agents used in concentrations at which they give optimum fluidity. It will be noted that with our dispersing agent there is no difference in value between the "initial" and the "equilibrium" viscosities which indicates the excellence and stability of the dispersion.

| Dispersing Agent | Optimum Concentration of Dispersant Per Cent on Dispersate | pH of Dispersion | Apparent Viscosity Value °M. at 30 R. P. M. | |
|---|---|---|---|---|
| | | | Initial Value | Equilibrium Value |
| Lignin dispersant by our procedure | 1.0 | 7.75 | 10 | 10 |
| Commercial dialyzed waste sulfite liquor | 3.0 | 7.1 | 115 | 121 |
| Polymerized Na-Salt of alkyl-naphthalene sulfonic acid | 1.0 | 7.75 | 30 | 121 |

*Example 2*

This dispersing agent is dissolved in water in amounts corresponding to 0.2% on the dispersate. To this solution is added "Kaolloid" clay to give 50% solids, and the mixture, after 15 minutes' stirring, is homogenized and the viscosity determined at 30° C. Dispersing efficiency thus measured for our lignin dispersing agent and for comparison for two other dispersing agents used in same weight proportion relative to the dispersate is given in the following table:

| Dispersing Agent | Per Cent of Dispersing Agent on Dispersate | pH of Dispersion | Apparent Viscosity Value °M. at 30 R. P. M. | |
|---|---|---|---|---|
| | | | Initial Value | Equilibrium Value |
| Lignin dispersant by our procedure | 0.2 | 6.95 | 9 | 12 |
| Commercial dialyzed waste sulfite liquor | 0.2 | 6.25 | 82 | 178 |
| Polymerized Na-salt of alkyl-naphthalene sulfonic acid | 0.2 | 6.50 | 86 | 120 |

Example 3

The properties for dispersing carbon black in water are evaluated by fluidity of a 20% carbon black slurry prepared as follows: Dispersing agent corresponding to 2% on the dispersate is dissolved in water, together with NaOH corresponding to 0.1% on the weight of carbon black used. To such solution is added carbon black (Micronex W6 powder) to give a slurry containing 20% carbon black. The slurry is stirred 15 minutes, then homogenized and fluidity determination made with the MacMichael viscosimeter at 30° C.

| Dispersing Agent | pH | Apparent Viscosity Value °M. at 30° C. | |
|---|---|---|---|
| | | Initial Value | Equilibrium Value |
| Lignin dispersant by our procedure | 7.8 | 46 | 46 |
| Commercial dialyzed waste sulfite liquor | 7.8 | 278 | 300 plus |
| Polymerized Na-Salt of alkylnaphthalene sulfonic acid | 7.8 | 80 | 300 plus |

We believe through these examples to have demonstrated the superiority of the dispersing agent made by our process over dialyzed waste sulfite liquor and also over one of the commonly used synthetic dispersing agents.

The dispersing action of our product is much reduced in presence of acids and salts, particularly sulfates, and this further emphasizes the process step for removing sulfates from our product. While such acid and salt sensitivity of our dispersing agent may exclude its use from certain applications, it also is a valuable property where control or abruption of dispersing action is desired. Examples of the latter action are when carbon black or clay slurries dispersed by our product are mixed with other components and the mixture subsequently coagulated by addition of acid and salts. In such process the pronounced reduction of dispersing action is very important for the desired coagulation.

We wish it understood that the above applications of our dispersing agent are given merely to illustrate its action in certain typical examples and that many details of our process as well as uses for our product can be varied by those skilled in the art, and such variations are intended to be included within the scope of the appended claims.

We claim:

1. The process of producing a partially desulfonated lignosulfonate dispersing agent which comprises heating a liquor containing calcium lignosulfonate compounds and caustic alkali, simultaneously introducing air into said liquor until the combustion products formed precipitate substantially all the calcium salts in solution, filtering off the insoluble calcium salts formed, acidifying the filtrate to precipitate partially desulfonated hydrolyzed lignosulfonate compounds, and washing the precipitate to remove soluble impurities to produce a dispersing agent.

2. The process of producing a partially desulfonated lignosulfonate dispersing agent which comprises heating waste sulfite liquor and caustic soda, simultaneously introducing air into said liquor and agitating until the combustion products formed precipitate substantially all the calcium salts in solution, filtering off the insoluble calcium salts formed, acidifying the filtrate to precipitate partially desulfonated hydrolyzed lignosulfonate compounds, washing the precipitate to remove soluble impurities and dissolving the washed product in water containing caustic alkali to produce a water-soluble dispersing agent.

3. The process of producing a partially desulfonated lignosulfonate dispersing agent which comprises heating under pressure a liquor containing calcium lignosulfonate compounds and caustic alkali at a temperature from 140° to 170° C., simultaneously introducing air into said liquor in amounts corresponding to consumption of about 25 to 40 grams $O_2$ per hundred grams lignin present in the original liquor, filtering off the insoluble calcium salts formed by reaction with the combustion products, acidifying the filtrate to precipitate partially desulfonated hydrolyzed lignosulfonate compounds, washing the precipitate to remove inorganic sulfates and other salts, dissolving the washed product in water containing caustic soda to give a pH of about 5 to 9 for the solution, and then drying the solution to yield a water-soluble dispersing agent.

4. The process of producing a partially desulfonated lignosulfonate dispersing agent which comprises heating under pressure a liquor containing essentially calcium lignosulfonate compounds and caustic alkali at a temperature from 140° to 170° C., said caustic soda being present in amount equivalent to about ½ to ⅔ of the weight of lignin present in the original liquor, simultaneously introducing air into said liquor in amounts corresponding to consumption of about 25 to 40 grams $O_2$ per hundred grams lignin present in the original liquor, filtering off the insoluble calcium salts formed by reaction with the combustion products, acidifying the filtrate to precipitate partially desulfonated hydrolyzed lignosulfonate compounds, washing the precipitate to remove inorganic sulfates and other salts, dissolving the washed product in water containing caustic soda to give a pH of about 5 to 9 for the solution, and then drying the solution to yield a water-soluble dispersing agent.

5. The process of producing a partially desulfonated lignosulfonate dispersing agent which comprises heating under pressure waste sulfite liquor and caustic alkali at a temperature from 140° to 170° C., continuously introducing air into said liquor until the causticity is reduced to a pH of 10.5 to 11 and substantially all the calcium salts in solution are precipitated by reaction with the combustion products, filtering off the insoluble calcium salts formed, acidifying the filtrate to precipitate partially desulfonated hydrolyzed lignosulfonate compounds, washing the precipitate to remove inorganic sulfates and other salts, dissolving the washed product in water containing caustic soda to give a pH of about 5 to 9 for the solution, and then drying the solution to yield a water-soluble dispersing agent.

6. The process of producing a partially desulfonated lignosulfonate dispersing agent which comprises heating under pressure waste sulfite liquor and caustic alkali at a temperature from 140° to 170° C., said waste sulfite liquor being substantially free of sugars, said caustic soda being present in amount to maintain a pH 10.5 to 11, continuously introducing air into said liquor until substantially all the calcium salts in solution are precipitated, filtering off the insoluble calcium salts formed by reaction with the combustion products, acidifying the filtrate to precipitate partially desulfonated hydrolyzed lignosulfonate compounds, washing the precipitate to remove inorganic sulfates and other salts, dissolving the washed product in water containing caustic soda to give a pH of about 5 to 9 for the solution, and then drying the solution to yield a water-soluble dispersing agent.

7. The process of producing a partially desulfonated lignosulfonate dispersing agent which comprises heating under pressure a liquor containing essentially calcium lignosulfonate compounds and caustic alkali at a temperature from 140° to 170° C., said caustic soda being present in amount to maintain a pH 10.5 to 11, continuously introducing air into said liquor in amounts corresponding to consumption of 25 to 40 grams $O_2$ per hundred grams lignin present in the original liquor, extracting phenolic compounds present in the resulting solution, filtering off the insoluble calcium salts formed by reaction with the combustion product, acidifying the filtrate to precipitate partially desulfonated hydrolyzed lignosulfonate compounds, washing the precipitate to remove inorganic sulfates and other salts, dissolving the washed product in water containing caustic soda to give a pH of about 5 to 9 for the solution, and then drying the solution to yield a water-soluble dispersing agent.

8. A water-soluble dispersing agent comprising a relatively low average molecular weight partially desulfonated lignosulfonate, substantially free from non-ligneous organic compounds and inorganic salts made in accordance with the process of claim 1.

9. A water-soluble dispersing agent comprising a relatively low average molecular weight partially desulfonated lignosulfonate, substantially free from non-ligneous organic compounds and inorganic salts made in accordance with the process of claim 3.

JORGEN RICHTER SALVESEN.
CARLYLE HARMON.
WILLIAM C. BROWNING.

REFERENCES CITED

The following references are of record in the file of this patent:

UNITED STATES PATENTS

| Number | Name | Date |
|---|---|---|
| 1,149,420 | Strehlenert et al. | Aug. 10, 1913 |
| 1,268,774 | Soraas | June 4, 1918 |
| 2,057,117 | Sandborn et al. | Oct. 13, 1936 |
| 2,371,136 | Harmon | Mar. 13, 1945 |
| 2,405,450 | Salvesen et al. | Aug. 6, 1946 |